Oct. 6, 1936.  H. RÖHM  2,056,586
LIVE CENTER
Filed Dec. 21, 1935  2 Sheets-Sheet 1

Inventor:
Heinrich Röhm
Attorneys:

Oct. 6, 1936.  H. RÖHM  2,056,586

LIVE CENTER

Filed Dec. 21, 1935  2 Sheets-Sheet 2

Inventor:
Heinrich Röhm
Attorneys:

Patented Oct. 6, 1936

2,056,586

UNITED STATES PATENT OFFICE 2,056,586

LIVE CENTER

Heinrich Röhm, Zella-Mehlis, Germany

Application December 21, 1935, Serial No. 55,627
In Germany May 23, 1934

8 Claims. (Cl. 82—33)

This invention relates to a center rotating with the work and arranged in a casing on roller and ball bearings adapted to take up the compressive forces acting in the longitudinal direction of the center as well as those acting transversely thereto.

Centers of this type were previously known whose centers were journalled on inclined roller bearings and roller or ball bearings to take up the axial pressure, wherein the bearings could move together in axial direction against spring pressure in order to compensate for the variations in length of the object machined.

An object of the invention is to provide in such centers an automatic pressure equalization also of the individual bearings with respect to each other, so that the bearings can adjust themselves in definite relation to each other, but nevertheless, individually, according to the pressure on the individual bearing.

A further object of the invention is to relieve the bearing for taking up the pressure in the direction of the longitudinal axis of the center, of radial load and angular moments or forces which tend to tilt the center.

Other objects of the invention will be apparent from the following specification and drawings.

Figure 1:
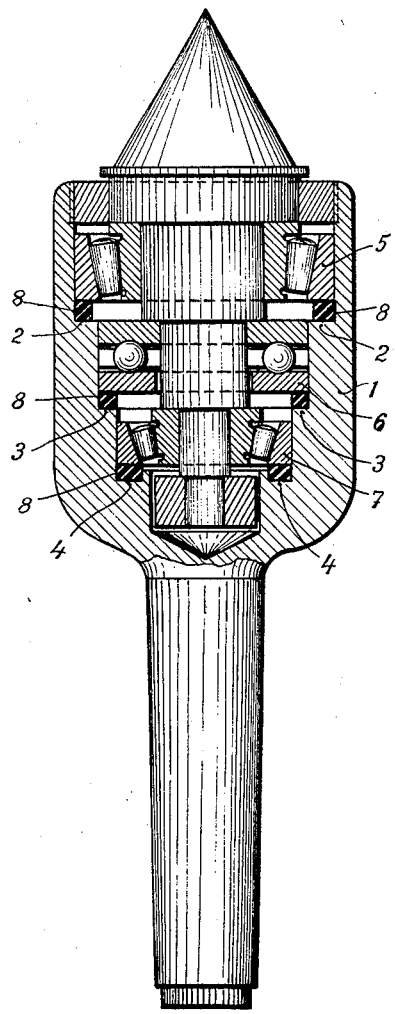
Figure 2:
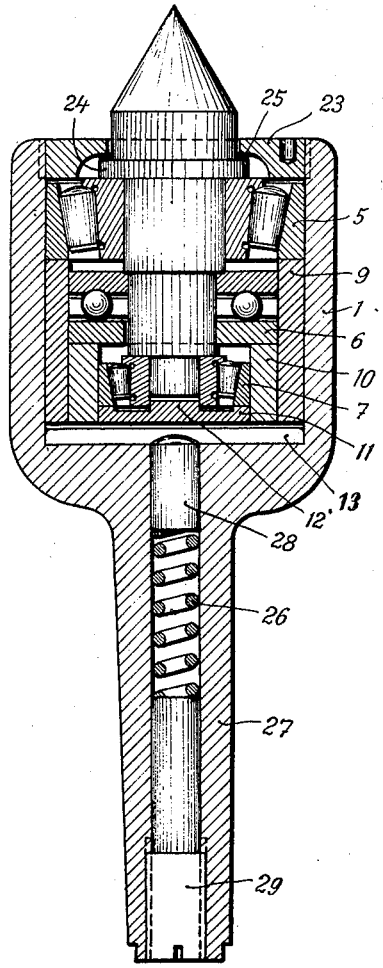
Figure 3:
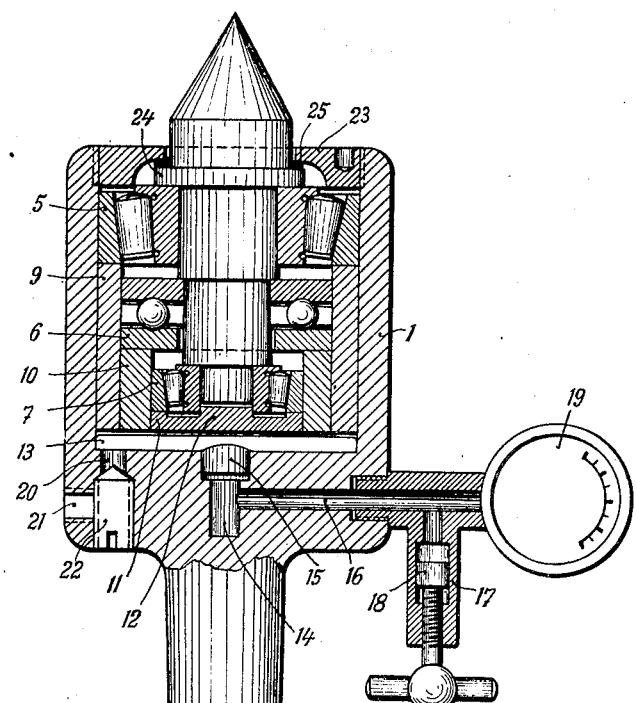

By way of example, four embodiments of the invention are shown in cross section in the accompanying drawings, in which Figure 1 shows a center with each bearing separately sustained by an elastic support on the casing. Fig. 2 shows a center the bearings of which are sustained by a common yielding support and wherein compensation of pressure for the center is automatically effected by spring action. Fig. 3 shows a center the bearings of which are sustained by a common elastic support and which is provided with a pressure piston and a pressure gauge for compensation and observation, respectively; and Fig. 4 shows the middle portion of a center with granular material such as small balls or the like serving as elastic support.

Referring to the drawings, 1 designates the housing in which the bearings and the shank of the center are located. In general, according to the invention, for overcoming the previously mentioned difficulties, there are provided at the interior of housing 1 a plurality, for example, three, individually supported and axially slidable bearings with the outer races or bearings 5, 6 and 7, in order to obtain a proportional load for all bearings on which the axial and radial pressures are distributed, thus assuring an automatic and uniform precision adjustment of the bearings relative to each other and the centric path of the center. Furthermore, as shown in the drawings, the axial bearing 8 is relieved from radial load and tilting moments, while the roller bearings 5 and 7 for taking up radial pressures are loaded proportionally to their distance from the point of the center.

The center according to the invention further serves the purpose of compensating the increased axial pressure due to the heating of the work, so that the loading of the center and thus of the bearings 5, 6 and 7 remains approximately the same.

Figure 4:
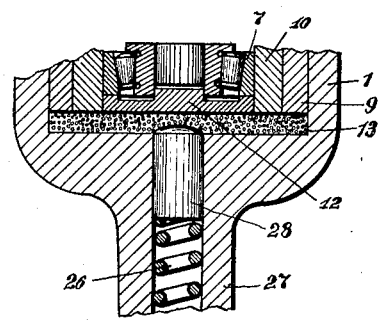

According to the invention, each bearing 5, 6 and 7 is sustained in axial direction by a yielding support in the casing of the center, the support being either common to all bearings as shown in Figs. 2, 3 and 4, or separate for each of them as shown in Fig. 1. According to conditions and requirements, the yielding support may be of varying type and consist, for instance, of a solid cohering material like leather or rubber, whereby substantially load compensation of the bearings is effected, or it may be composed of granular or pulverulent material, such as small steel balls, filings or the like, as shown in Fig. 4.

Mutual compensation of pressure of the bearings 5, 6 and 7 in connection with compensation of pressure of the center itself is preferably attained by means of a support comprising a flowing material like grease or oil.

Referring to the individual embodiments, the interior chamber of housing 1 is provided with stepped annular projections 2, 3, 4, which support the bearing rings 5, 6, 7 between which the rings 8 made of elastic material are disposed.

The ball bearing 6 arranged between the roller bearings 5, 7 serves, as in the other constructions shown, for taking up axial pressure and is completely relieved from radial pressures by the two roller bearings. To prevent excessive stressing of the roller bearings by axial pressure in case of uneven wear thereof and of the ball bearing, the yielding annular supports 8 are inserted. In the event of uneven or disproportional distribution of pressure these rings 8 are capable of yielding in accordance with the undue increase in pressure, whereby the bearing concerned is relieved while the other bearings are loaded correspondingly more and the correct proportional loading of all bearings is always automatically restored.

Radial loading is compensated by the statically ascertained distance of the roller bearings and of the working points in the center proportionally to the capacity of the bearing, so that the axial bearing is free from radial load. Each bearing automatically adjusts itself so as to take up its share of axial pressure. Any unevenness due to wear or rotation of the ball races or roller members is automatically compensated to insure constant automatic fine adjustment of the bearings.

These features of the invention apply also to the three other embodiments which chiefly differ only as to the kind and arrangement of the pressure compensating medium.

In the construction according to Figs. 2 and 3 the casing 1 has perfectly cylindrical inner surfaces. The bearing rings 5, 6, 7 are supported by the rings, 9, 10, 11, the ring 11 being closed to form a plate 12. The rings and the plate 12 abut against the elastic medium in the space 13, which may be an elastic support of solid material like leather or rubber, or a flowing medium such as grease or oil, or granular or pulverulent material such as small balls or the like, as shown in Fig. 4, may be filled in. In the construction shown in Figs. 2 and 3, a fluid medium, preferably oil, is filled in the space 13 whose bottom opening 14 is closed by the movable piston 15. According to Fig. 3, the bore 14 is in communication with a channel 16 leading to the cylinder 17 with the regulating piston 18, the rod of which is threadedly adjustable relative to the cylinder 17, and to the pressure gauge 19. The pressure medium is filled through the bores 20, 21 into the space 13, whereupon the bore 20 is closed by means of the screw plug 22. Compensation of pressure with respect to the bearing rings 5, 6, 7 is effected by means of the rings 9, 10, 11 which are capable of displacement in axial direction. The basal surfaces of the rings in contact with the elastic medium in the space 13 are dimensioned proportionally to the pressures developed by the bearings. In case of excessive pressure exerted upon the center, the flowing medium in the space 13 will push back the piston 15, so that all bearings together with the center can yield when the regulating piston 18 is operated. The pressure of the center itself can be read on the pressure gauge. The distance of the lower surfaces of the rings 9, 10, 11 from the bottom of the casing is so chosen that the center cannot move out of the bore of the work to such an extent that the work will slip off from the center. To limit the motion, stops may be provided within the space 13. The casing 1 is closed on top by a plate 23 which limits motion of the center in the direction of the point proper. Between the projection 24 of the center shaft and the inner edge of the plate 23 a packing 25 is provided.

The construction shown in Fig. 2 corresponds to that of Fig. 3, with the difference, however, that instead of the pressure gauge and pressure balancing piston a spring 26 is provided in the shaft 27 of the casing 1. The bore of the member 27 contains a piston 28 acted upon by the pressure of the pressure balancing medium in the space 13. Since, as in Fig. 3, this piston 28 constitutes only a slight part of the entire cross section of the bottom surface of the casing 1, the pressure to which it is subjected is relatively small compared with the total axial pressure exerted upon the center, so that the spring 26 may be relatively weak. Compensation in case of excessive center pressure is automatically effected. The highest permissible pressure upon the center up to the yielding of the point can be regulated by the set screw 29 which acts upon the spring 26.

Instead of the packing 25, or in addition thereto, a thrust bearing provided for instance with granular material such as small balls or the like may be inserted, which is pressed by the plate 23 against the center point.

I claim:—

1. A live center, comprising a casing, roller bearings between the center and the casing for taking up transverse compressive forces, ball thrust bearings for taking up compressive forces acting in the longitudinal direction of the center, yielding supports for sustaining the roller and ball bearings in the casing, said yielding supports consisting of a liquid material, a regulatable pressure piston connected withe the casing and adapted to press the liquid material forming the yielding supports into the casing, and a pressure gauge connected with the casing.

2. A live center, comprising a casing, roller bearings between the center and the casing for taking up transverse compressive forces, ball thrust bearings for taking up compressive forces acting in the longitudinal direction of the center, yielding supports for sustaining the roller and ball bearings in the casing, said yielding supports consisting of a liquid material, a displaceable piston of relatively small cross section connected with the casing for closing the space containing the liquid material, and a compression spring actuating said piston.

3. A live center according to claim 2, wherein the compression spring is regulatable.

4. Rotatable live center, comprising a housing, inclined roller bearings between the center point and the housing substantially for taking up the radial forces, ball thrust bearings for taking up the compressive forces acting in the longitudinal direction of the center, and separate yielding supports between each bearing and the housing.

5. Rotatable live center, comprising a housing, inclined roller bearings between the center point and the housing substantially for taking up the radial forces, ball thrust bearings for taking up the compressive forces acting in the longitudinal direction of the center, longitudinally slidable members within said housing and separately acted upon by said bearings, and a common yieldable support between said members and the housing.

6. Rotatable live center, comprising a housing, inclined roller bearings between the center point and the housing substantially for taking up the radial forces, ball thrust bearings for taking up the compressive forces acting in the longitudinal direction of the center, separate yielding supports between each bearing and the housing, and a common fluent support between said yieldable supports and the housing.

7. Rotatable live center, comprising a housing, inclined roller bearings between the center point and the housing substantially for taking up the radial forces, ball thrust bearings for taking up the compressive forces acting in the longitudinal direction of the center, stepwise projecting shoulders in the housing adjacent each bearing, and separate resilient supports between each of said bearings and the shoulders.

8. Rotatable live center, comprising a housing, inclined roller bearings between the center point and the housing substantially for taking up the radial forces, ball thrust bearings for taking up the compressive forces acting in the longitudinal direction of the center, longitudinally slidable members within said housing, said bearings adjacent and separately acted upon by said bearings comprising supporting rings for the bearings closest adjacent said center point, a self-contained plate for the bearing farthest removed from said point, and a common yielding support between said plate and said rings, and the housing.

HEINRICH RÖHM.